(12) United States Patent
Herbison et al.

(10) Patent No.: US 7,451,393 B1
(45) Date of Patent: Nov. 11, 2008

(54) SYSTEM AND METHOD FOR A PAGE RENDERING FRAMEWORK

(75) Inventors: B.J. Herbison, Bolton, MA (US); Shadrack K. Kilemba, Nashua, NH (US); Peter J. Chestna, Auburn, MA (US); Andres M. Perez, Waltham, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 140 days.

(21) Appl. No.: 10/747,867

(22) Filed: Dec. 23, 2003

(51) Int. Cl.
*G06F 17/00* (2006.01)
(52) U.S. Cl. .................. 715/234; 715/226; 715/760
(58) Field of Classification Search ............... 715/513, 715/234–237, 202; 719/311; 707/10
See application file for complete search history.

(56) References Cited

U.S. PATENT DOCUMENTS

| | | | | |
|---|---|---|---|---|
| 6,877,025 | B2* | 4/2005 | Copeland et al. | 709/203 |
| 7,036,072 | B1* | 4/2006 | Sulistio et al. | 715/517 |
| 2001/0034771 | A1* | 10/2001 | Hutsch et al. | 709/217 |
| 2003/0014443 | A1* | 1/2003 | Bernstein et al. | 707/513 |
| 2003/0191677 | A1* | 10/2003 | Akkiraju et al. | 705/8 |
| 2004/0046789 | A1* | 3/2004 | Inanoria | 345/748 |
| 2004/0098396 | A1* | 5/2004 | Hsu et al. | 707/100 |
| 2004/0123238 | A1* | 6/2004 | Hefetz et al. | 715/513 |
| 2004/0148565 | A1* | 7/2004 | Davis et al. | 715/501.1 |
| 2004/0168124 | A1* | 8/2004 | Beisiegel et al. | 715/513 |
| 2004/0210500 | A1* | 10/2004 | Sobel et al. | 705/35 |
| 2005/0097008 | A1* | 5/2005 | Ehring et al. | 705/26 |
| 2005/0210379 | A1* | 9/2005 | Weathersby et al. | 715/513 |

\* cited by examiner

*Primary Examiner*—Doug Hutton
*Assistant Examiner*—Quoc A Tran
(74) *Attorney, Agent, or Firm*—Brooks Kushman P.C.

(57) ABSTRACT

Efficient development of conventional web applications suggests extensive and thorough knowledge of web page delivery technologies such as HTML, Java, and JSPs. A rendering framework to define the static, cosmetic, "window dressing" type of content, replicated across multiple pages, in a single JSP template file which can then incorporate or include the dynamic, active content from other files, mitigates development inefficiencies. Such a rendering framework represents each screen output page by a file including the active content, while avoiding replication of the static content. Such inclusions may be nested in a hierarchical manner to enumerate the static content in one file and allow a web application to include active content according to a hierarchical inheritance. Metadata components, such as XML files, include the active content according to a predetermined declarative syntax, thereby facilitating implementation, which the framework then interprets into a resulting output page such as a JSP page.

28 Claims, 9 Drawing Sheets

SYSTEM AND METHOD FOR A PAGE RENDERING FRAMEWORK

BACKGROUND OF THE INVENTION

The advent of the Internet has spawned a new generation of web driven computer software applications replacing the more traditional standalone desktop applications. Such web applications are often similar to their desktop counterparts, except that a web based graphical user interface (GUI) replaces the traditional windows interface. The web based interface typically conforms to a Hypertext Markup Language (HTML), as is known to those of skill in the art. HTML is widely employed for web-based interfaces operable over the Internet or other networks such as intranets, extranets, and virtual private networks (VPNs). Such a web interface includes a series of output screens operable for display on a user output device (e.g. monitor). The web interface operates in conjunction with a remote browser application on the user's system via an Internet connection.

In a typical conventional Internet application environment, development of a web based interface employs a set of development tools and languages directed at producing a web browser based GUI. Efficient usage of the development tools to develop such a browser based GUI benefits from extensive and thorough knowledge of the development tools and platforms directed at the browser GUI. However, modern software development is a time intensive and rigidly scheduled activity. The so-called "ramp-up" time to acquaint and educate a developer with unfamiliar platforms can be substantial. Accordingly, developer proficiency with a given framework or platform is a highly visible variable in the software task management of a web application development effort.

SUMMARY

Conventional web applications present a series or set of screens to a user arranged in a hierarchical or sequential manner. A user navigates among the screens to interact with the web application, typically by entering data and receiving output via various portions of the screen (e.g. windows) displayed and fetched by the web application. The web application typically models the set of screens as a separate HTML GUI application layered on top of the underlying software application. Often, the development tools and platforms employed for the HTML GUI application differ from those employed for the underlying software application.

In a typical conventional software development environment, developers (i.e. software engineers) are usually highly proficient at particular platforms, applications, and/or languages which are centric to the application task under development. However, web application development typically requires a set of skills not normally possessed by typical application developers. Web application development, i.e. applications for remote execution via an Internet based interface, typically employ specialized toolkits, applications, and languages. Efficient development of conventional web applications suggests extensive and thorough knowledge of web page delivery technologies such as HTML, Javascript, Java, Servlets, JSPs, and others. In particular, application developers may not be highly efficient at the tools and methodology typically employed in developing a conventional browser-based interactive GUI typically integrated with such underlying software applications.

The present invention is based, in part, on the observation that a typical conventional web application frequently replicates web page content across multiple web output screens. Often, a conventional application displays tangential or background information around the screen perimeter or in a status bar on the side of the screen. Such tangential and background information often remains unchanged from screen to screen. Also, a particular linear progression of screens, possibly as part of a larger hierarchy of screens, may leave certain portions or windows of the conventional screen unchanged, or static, along much or all of the linear progression. For example, a typical login screen sequence may prompt for a username, password, and authentication data such as a certificate or verification information. Only the active data entry portions of the screen differ from screen to screen. The remaining areas, or portions of the conventional screen, continue to display background information around the perimeter and/or status portion. Such cosmetic "window dressing" information and other content remains unchanged, or static, throughout much or all of the screen sequence.

Typical conventional web applications display output content via a screen output page file such as a Java Server Page (JSP). Such a conventional web application contains a JSP page for each web page in the application, and stores each JSP page in a separate conventional file. Accordingly, a typical conventional application contains many JSP files corresponding to each screen. A typical conventional JSP page contains many lines of HTML code for displaying, or rendering, screen output. One typical implementation practice for developing the multitude of JSP files is to copy the conventional JSP file from a file representing a similar screen and modify the active content portion to generate the different active content while leaving the static content unchanged from the copied JSP file. Therefore, the conventional practice is to develop a series of JSP files including the static, window dressing cosmetic features, and supplement the static content in each JSP page with active content for supporting the dynamic aspects of each particular screen.

Accordingly, a developer of a typical conventional web application generates a JSP file for each output screen by copying a similar JSP file and modifying a relatively small number of lines of the JSP file which manipulate the active content such that the active content portions perform the proper functions and operations for the particular page. The result is, therefore, a set of JSP files which include a large percentage of static content replicated across many files, in which each of the conventional files includes a relatively small portion of active content which performs the salient functions and operations of the particular page.

The resulting set of conventional JSP files collectively supporting a particular operation therefore represents a large amount of replicated code. Such a set of JSP files may become unwieldy, when, for example, a modification is to be made to a header bar or status window. The developer then modifies many conventional files corresponding to the replicated portions of passive content included in the set of JSP files. Further, such a large quantity of replicated static content consumes additional resources by way of disk storage and transmission bandwidth for storing and manipulating the set of JSP files when executing the application.

It would be beneficial to provide a rendering framework to define the static, cosmetic, "window dressing" type of content, replicated across multiple pages, in a single template file which can then incorporate or include the dynamic, active content from other files. Such a rendering framework would represent each screen output page by a file including the active content, while avoiding replication of the static content. Further, the inclusions may be nested in a hierarchical manner to enumerate the static content in one file and allow a web application to include active content according to a hierarchical inheritance. It would be further beneficial to provide such inclusions according to a predetermined declarative syntax which is verifiable according to syntax rules and which allows entry and manipulation as standard text, thereby facilitating implementation, which the framework interprets the declarative syntax into a resulting output page such as a JSP page.

Configurations of the invention overcome several shortcomings of the typical conventional development methodology described above. The system of the rendering framework defined by the present invention provides a rendering engine that receives a page template corresponding to an output page for rendering by the application. The page template is a JSP file or other format operable for rendering a responsive HTML output page to a requesting user. The page template contains the passive content, and includes tokens identifying the dynamic content areas, or portions, of the page. A parser parses the tokens and maps the token to metadata components including a set of page descriptors. The page descriptors conform to a predetermined syntax, such as the Extensible Markup Language (XML), and describe the dynamic content for insertion in the page template by replacing the token with the corresponding interpretation of the page descriptors. A syntax processor has syntax processing components, such as javabean components, for processing the page descriptors in the metadata components and retrieving display data and output data accordingly. The syntax processing components generate the dynamic content portions corresponding to the parsed tokens from the page descriptors. A page formatter receives the dynamic content portions and formats the dynamic content into the page template to build the output page. The web server then renders the output page as an HTML response to the user. In this manner, the rendering framework alleviates the demands on the software application developer presented by cumbersome and/or unfamiliar web based technology, thereby providing higher reliability and less maintenance prone code.

In further detail, the system of the invention disclosed herein provides a method for producing an output report by identifying a page template indicative of an output report having passive content, in which the passive content is static, and parsing tokens from the page template, in which the tokens are indicative of dynamic content adapted to provide at least a portion of the output report. For each token, generate the dynamic content, generating further comprising fetching output data and processing display data, the output data operable to be retrieved from a dynamic repository and display data operable to indicate organization of the fetched output data, and build the output report by assembling the generated dynamic content for each token in the page template.

Particular configurations of the invention include a web application, in which the method involves receiving a user request for HTML page, in which building further includes rendering the HTML page responsive to the user request. Such dynamic content further comprises java server pages referencing metalanguage representations of at least portions of other java server pages corresponding to the same rendered output report. Accordingly, in particular configurations, producing the output report further includes receiving an HTTP request on behalf of a user, the HTTP request indicative of an HTML response, and determining the page template corresponding to the requested HTML response. A rendering engine then generates a JSP output page from the identified page template, and transmits the generated JSP output page to the user as an HTML page.

In other configurations, the display data is formatted according to a predetermined syntax, which is well suited for parsing and verification of the display data. Typically, it is expected that the predetermined syntax is a different syntax than the template, such that generating further comprises interpreting the display data from the predetermined syntax into the syntax defining the template. The predetermined syntax includes syntactical elements, and is further operable for nesting the syntactical elements, the nested syntactical elements defining a hierarchical structure. The predetermined syntax may, in particular configurations, conform to XML, in which the syntactical elements further comprise XML tags. Further, the predetermined syntax denotes a page descriptor syntax defined by an XML schema.

In such an XML based configuration, the tokens are metadata tokens, in which the rendering engine parses the metadata tokens from the page template, each of the metadata tokens indicative of dynamic content, and retrieves, from a metadata repository, in which the metadata components correspond to the metadata tokens and are operable to provide the dynamic content corresponding to the parsed metadata token. The rendering engine then retrieves, based on the metadata components, the display data and the output data from a repository, in which the display data and output data correspond to the dynamic content for rendering on the output report. Syntax processing components, or javabeans, process the metadata components using the retrieved display data and output data to generate the dynamic content corresponding to the parsed metadata token, and insert the dynamic content in the output report by replacing the parsed metadata token.

Such metadata components further comprise page descriptors, in which the page descriptors conforming to a declarative syntax and indicative of the dynamic content. Parsing further includes identifying a javabean component operable to process the metadata token. The javabean syntax processing component retrieves the metadata component, and processes the metadata component. The metadata components may be XML files including at least one page descriptor according to the predetermined syntax, as described above, in which processing further comprises iteratively retrieving the page descriptors by the javabean components and producing HTML code corresponding to the page descriptors. Such display data further may further include user specific views, in which the user specific views indicative of formatting and display preference specific to a particular user and operable for interpretation by syntax processing components to render the display data according to the user specific view.

The invention as disclosed above is described as implemented on a computer having a processor, memory, and interface operable for performing the steps and methods for monitoring and processing events in an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Particular configurations of the invention provide a rendering framework to define the static, cosmetic, "window dressing" type of content, replicated across multiple pages, in a single template file which can then incorporate or include the dynamic, active content from other files. Such a rendering framework represents each screen output page by a file including the active content, while avoiding replication of the static content. Such inclusions may be nested in a hierarchical manner to enumerate the static content in one file and allow a web application to include active content according to a hierarchical inheritance. Metadata components, such as JSP files, include the active content according to a predetermined declarative syntax which may be verified according to syntax rules and which allows entry and manipulation as standard text, thereby facilitating implementation, which the framework then interprets into a resulting output page such as a JSP page.

Configurations of the invention overcome several shortcomings of the typical conventional development methodology described above. The system of the rendering framework defined by the present invention provides a rendering engine that receives the page template corresponding to an output page for rendering by the application, typically in response to a user Hypertext Transfer Protocol (HTTP) page request from the browser. In a particular exemplary configuration disclosed below, the page template is a JSP file for rendering a responsive HTML output page to a requesting user. The page template contains the passive content, and includes tokens identifying the dynamic content of the page. The parser parses the tokens and maps the token to metadata components including a set of page descriptors. The page descriptors are defined in XML or other metalanguage, and describe the dynamic content for insertion in the page template by replacing the token with the corresponding interpretation of the page descriptors.

The syntax processor has syntax processing components for processing the metalanguage (e.g. XML), which are javabean components in the exemplary configuration, for processing the page descriptors and retrieving display data and output data accordingly. The syntax processing components generate the dynamic content portions, corresponding to the parsed tokens, from the page descriptors. A page formatter receives the dynamic content portions and formats the dynamic content into the page template to build the output page, or report. The web server then renders the output page (e.g. report) as an HTML response page to the user. In this manner, the rendering framework alleviates the demands on the software application developer presented by cumbersome and/or unfamiliar web based technology.

Figure 1:
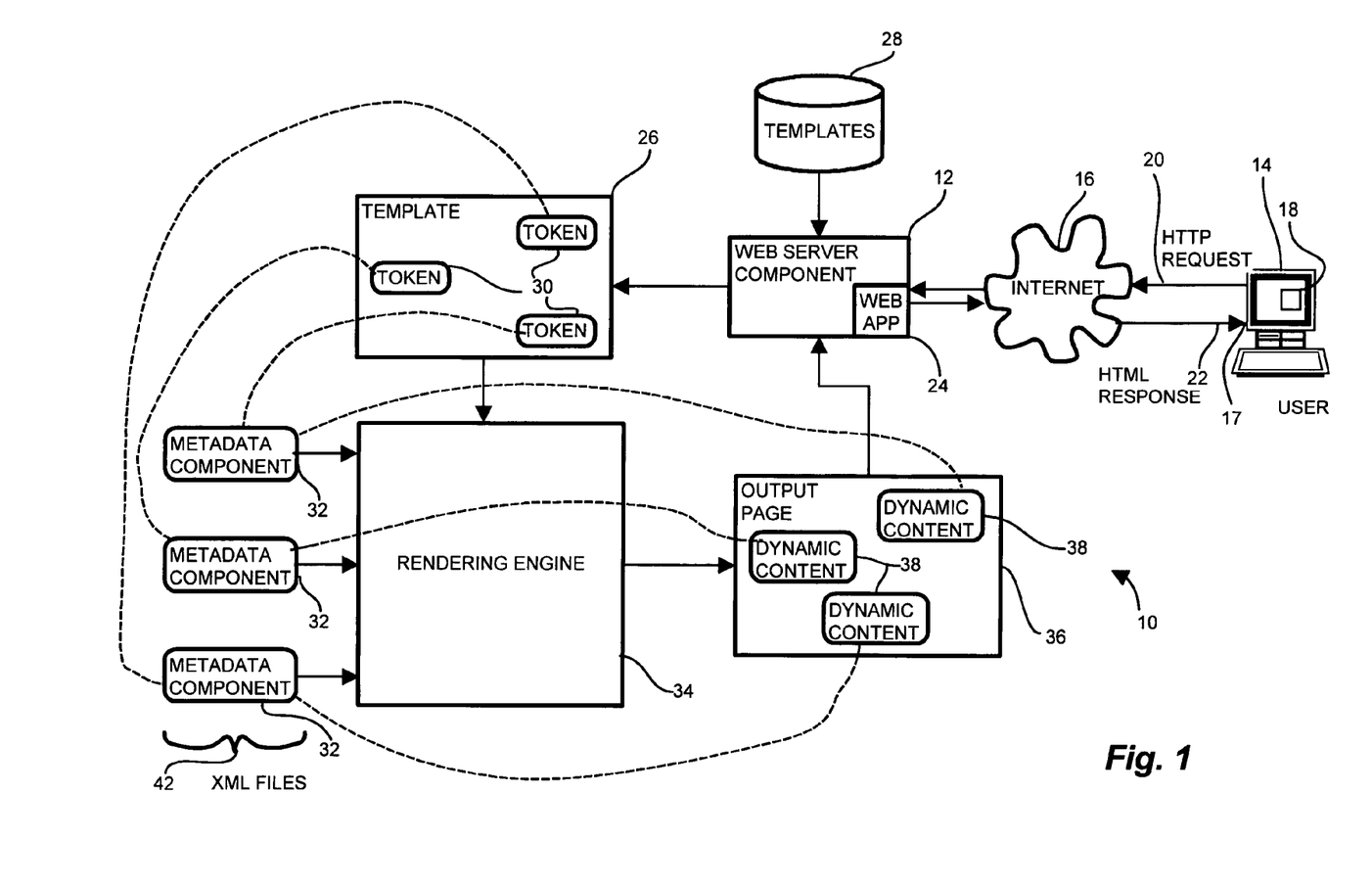
FIG. 1 is a context diagram of a web application development environment including the rendering engine of the system of the present invention.

FIG. 1 is a context diagram of a web application development environment including the rendering engine of the system of the present invention. Referring to FIG. 1, the web application environment 10 includes a user device 14 for interacting with a user (not specifically shown) having a connection to the Internet 16 for accessing a web server component 12. Typically the user 14 employs a browser 18, such as Netscape Browser or Microsoft Internet Explorer, for issuing HTTP requests 20 to a web application 24 via the web server 12 and receiving HTML responses 22, or output report, from the web server 12.

The web server 12 is operable to access a template 26, from a template repository 28, for processing the HTTP request 20, discussed further below. The template 26 includes tokens 30, corresponding to metadata components 32. In the particular exemplary configuration, the metadata components 32 are XML files 42, also discussed further below. A rendering engine 34 receives the template 26 and determines the corresponding metadata components 32 from the tokens 30. The rendering engine 34 processes the metadata components 32 to generate dynamic content 36 corresponding to each of the tokens 30. The rendering engine 34 replaces the tokens 30 in the template 26 with the generated dynamic content 38 to produce the output page 36, as will be discussed further below with respect to FIG. 3. The web server 12 transmits the output page 36 to the user 14 as an HTML response 22 from the web application 24 in response to the earlier HTTP request 20.

Figure 2:
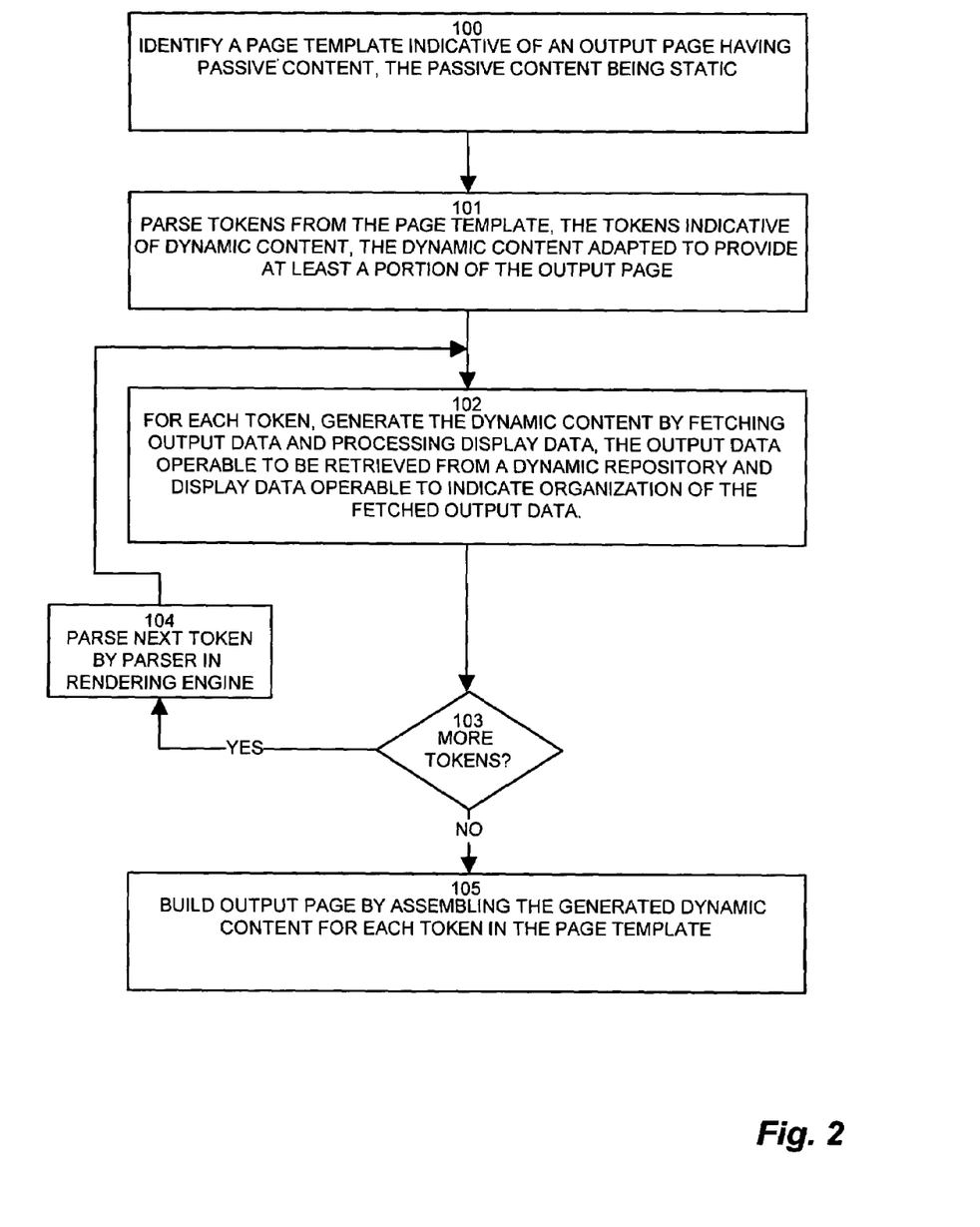
FIG. 2 is a flowchart of the system of the present invention.

FIG. 2 is a flowchart for rendering web output using the system of the present invention. Referring to FIGS. 1 and 2, the method for producing an output page 36 involves identifying a page template 26 indicative of an output page 36 having passive content, as depicted at step 100. The passive content is static portions of the output page which remain consistent from screen to screen. The page template 26 may be a default template, or may have a higher granularity in which the web server component 12 or web application 24 executing therein selects an initial template 26 for a particular application, server, or user. For example, in a particular configuration, templates 28 correspond to main pages, popups, and wizards, such as installation and configuration wizards.

The rendering engine 34 receives the page template 26 and parses tokens 30 from the page template 26, in which the tokens 30 are indicative of the dynamic content 36 on the output page 38, as shown at step 101. The dynamic content 36 provides at least a portion of the output page 36, and can vary depending on the number of tokens 30 on the template 26. The rendering support provided by the rendering engine 34 is more efficient when the rendering engine 34 mitigates the need for much replicated display code in the output page (JSP file).

At step 102, for each token, the rendering engine 34 generates the dynamic content 36 by fetching output data and processing display data corresponding to the dynamic content. The output data is operable to be retrieved from a dynamic repository (54, discussed further below) and display data operable to indicate organization of the fetched output data. Display data indicates the organization of the data, and output data corresponds to the data values therein. Javabean components, discussed further below, or other software processing entity, perform processing on a metadata component 32 to generate the dynamic content corresponding to each parsed token 30.

A check is performed, at step 103, to determine if there are more tokens 30 in the current template 26. If there are more tokens 30 in the page template 26, then at step 104 the rendering engine 34 parses the next token 30 and control reverts to step 102. The rendering engine 34 then builds the output page 36 by assembling the generated dynamic content 38 for each token 30 in the page template 26, as depicted at step 105. The dynamic content 38, therefore, effectively replaces the corresponding token 30 in the template 26 to generate the output page 36.

Figure 3:
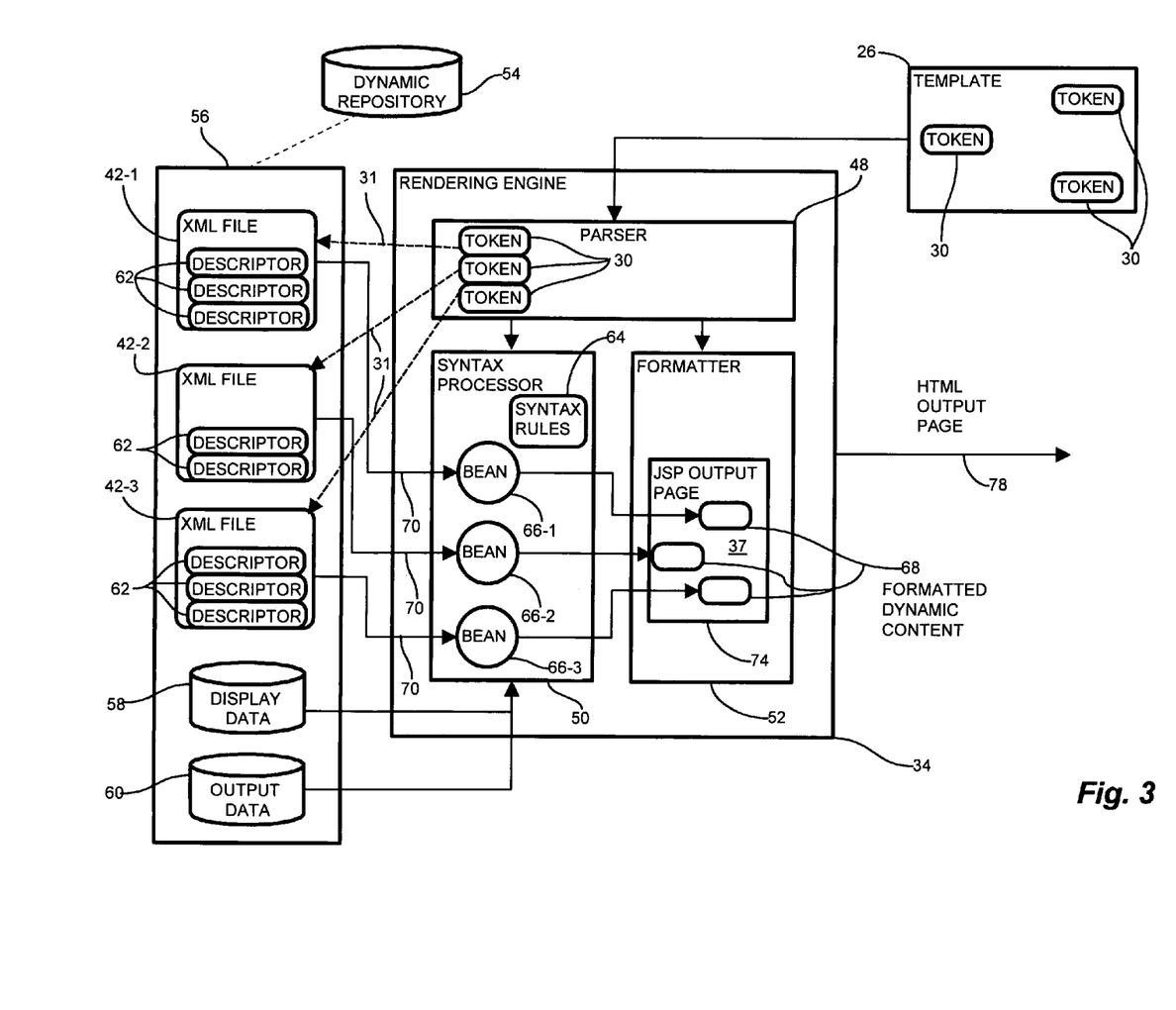
FIG. 3 is a block diagram of the rendering engine of FIG. 1 in greater detail.

FIG. 3 is a block diagram of the rendering engine 24 of FIG. 1 in greater detail. Referring to FIGS. 1 and 3, the rendering engine 34 includes a parser 48, a syntax processor 50, and a formatter 52. The rendering engine 34 also connects to a dynamic repository 54, shown within box 56, which is typically a mass storage device or array such as one or more disk drives (not specifically shown). The dynamic repository 54 stores the metadata components 32, which in the exemplary configuration are XML files 42-1 . . . 42-3 (42 generally). Each of the XML files 42 includes one or more descriptors 62, which are syntactical elements defining the dynamic content 38. The descriptors 62 conform to an XML metalanguage according to syntax rules 64. The dynamic repository 54 also includes the display data 58 and the output data 60, discussed further below.

The parser 48 parses the tokens 30 from the template according to the predetermined syntax defined by the syntax rules 64. The parser 48 then associates each parsed token 30 with a particular metadata component 32 for processing the token 30. Here, in the exemplary configuration, the parser 30 identifies a particular XML file 42 for processing each token 30, as shown by dotted lines 31.

The syntax processor 50 processes the XML files 42 by receiving each XML file into a syntax processing component such as a javabean component 66-1 . . . 66-3 (66 generally). In operation, the syntax processor 50 is responsive to the parser 48 to map each XML files 42 to a particular javabean component (bean) 66 responsive to the type of token 30 parsed. Each of the XML files 42 is therefore a metadata component 32 read by a particular javabean (bean) 66, as shown by arrows 70. The bean 66 is an executable object entity operable to receive the XML file 42, and read and interpret the sequence of descriptors 62 in each XML file 42. The bean 66 processes the XML file 42 according to the syntax rules 64, and accesses the display data 58 and output data 60 accordingly.

The syntax rules 64 define a declarative syntax for specifying the dynamic content 68. Descriptors 62 form a sequence of instructions according to the syntax rules 64 to direct the formatter 52 how to assemble the formatted dynamic content 68. In the exemplary configuration illustrated, the descriptors 62 included in each XML file are an XML sequence, or fragment, for indicating how to render the particular dynamic content item 68. The exemplary syntax rules 64 are therefore, in the illustrated configuration, an XML conformant metalanguage for processing metalanguage components for rendering via an output page template 26. Exemplary descriptors employable according to the syntax rules 64 are illustrated further below in TABLE I, and include metalanguage syntax elements, complex types, and simple types.

TABLE I

| ELEMENTS | COMPLEX TYPES | SIMPLE TYPES |
| --- | --- | --- |
| Action | AppTable | ActionComponentType |
| Chart | ChartType | ChartClasstype |
| Component | FilterElementType | ComponentType |
| ComponentAttribute | FilterType | SelectedType |
| ConfigSection | TableLinkType | TableCatagory |
| Option | TableType | TargetType |
| PresentationPage | | |
| Row | | |
| Script | | |
| Table | | |
| View | | |

The formatter 52 receives the dynamic content 36 from each bean 66 processing dynamic content 38 portions on a particular page 38. The dynamic content 38 represents the processing of the XML file 42 by the bean 66, including reading and manipulating the output data 60 read by the bean 66, and organizing the dynamic content 38 according to the display data 58. In operation, the formatter 52 receives the output from each bean 66, as shown by arrows 76, and formats each of the outputs 76 into formatted dynamic content 68. The formatter 52 also receives the original template 26 from the parser, and inserts the formatted dynamic content 68 into the template to generate a JSP output page 74. The rendering engine 24 then sends the JSP output page 74 as a rendered HTML output page 78 for display by the web server 12.

The exemplary configuration discussed above employs XML for the metadata components 32 because XML is a widely accepted parseable and verifiable metalanguage, as is known to those of skill in the art. Further, since it is text based, it lends itself well to code readability, and developers may manipulate it easily using conventional text editors. However, alternate configurations may employ other processing structures and syntax.

Figure 4:
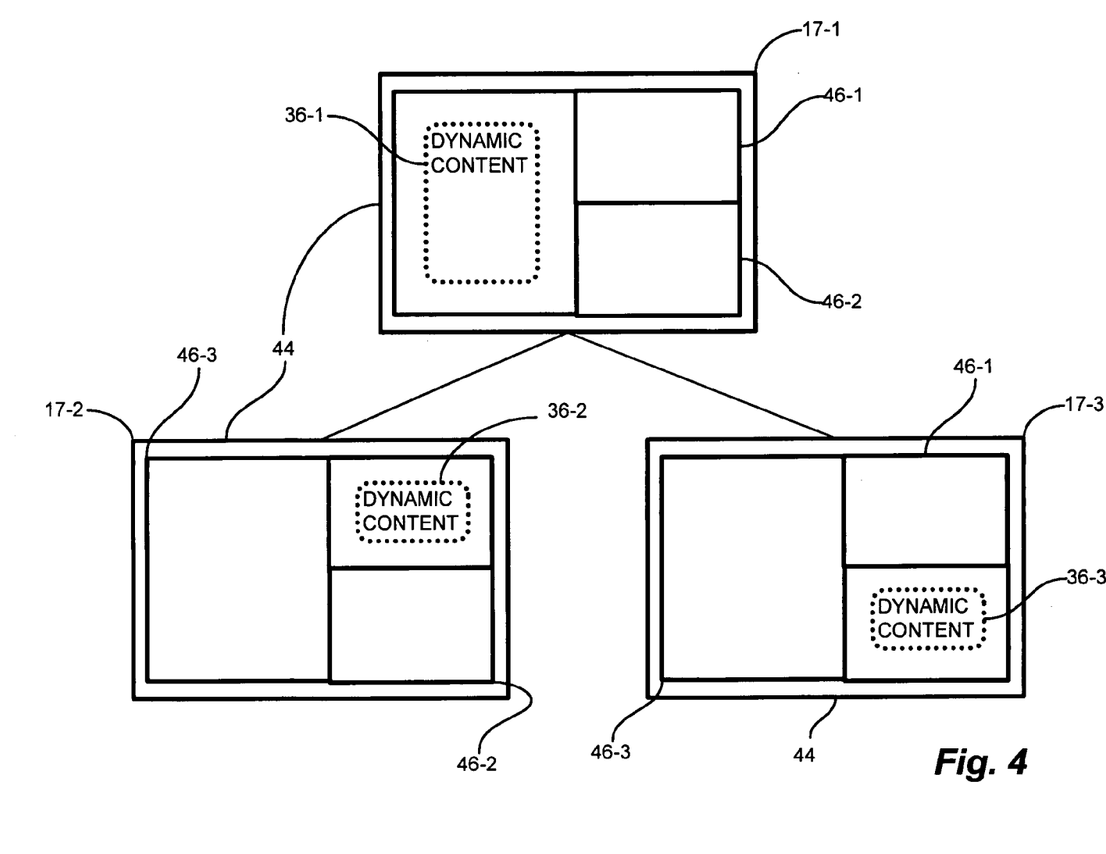
FIG. 4 is a hierarchy of output screens illustrating dynamic content portions as employed by the system of the present invention.

FIG. 4 is a hierarchy of output screens illustrating dynamic content portions as employed by the system of the present invention. Referring to FIGS. 1 and 4, the typical GUI incorporates a plurality of output screens 17-1 . . . 17-3. Other GUIs may have many more output screens 17 (generally). The user 14 controls navigation between the screens 17 via input from either the keyboard or mouse (not specifically shown), to direct the web application 24 via the browser 18 as is known in the art. In each screen 17-1 . . . 17-3, a dynamic content portion 36-1 . . . 36-3 is illustrated by the respective dotted line. The dynamic content portions 36 (generally) represent the screen portions 46 for receiving and displaying information. The remainder of each respective output screen 17 represents static content. In addition to the portions of static content 46-1 . . . 46-3 (46 generally) illustrated, the exemplary screens 17-1 . . . 17-3 each include a common border portion 44, also indicative of static content.

Figure 5:
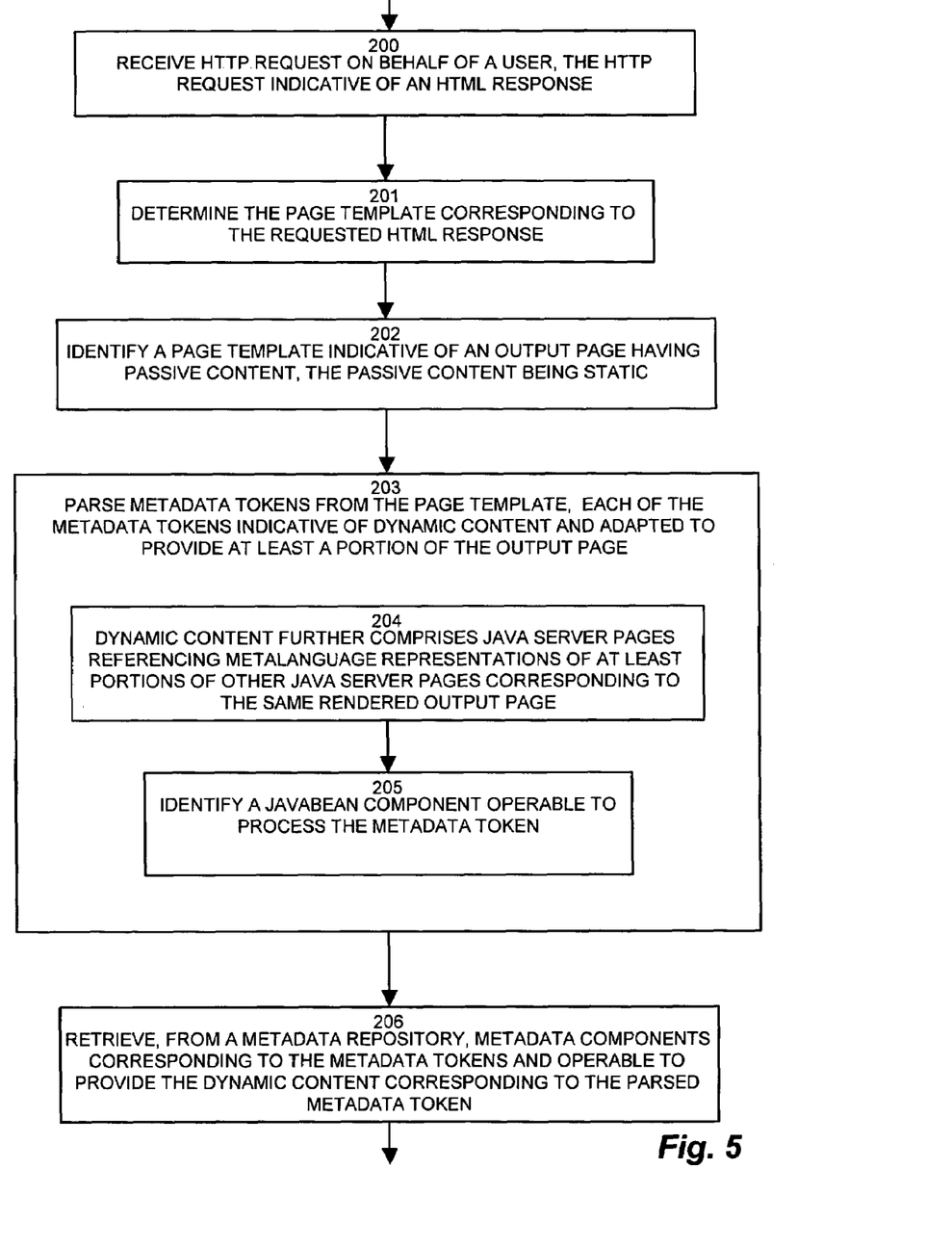
FIGS. 5-7 are a flowchart of a particular configuration of the invention of FIG. 1 in greater detail employing JSP template pages and XML descriptors.
Figure 6:
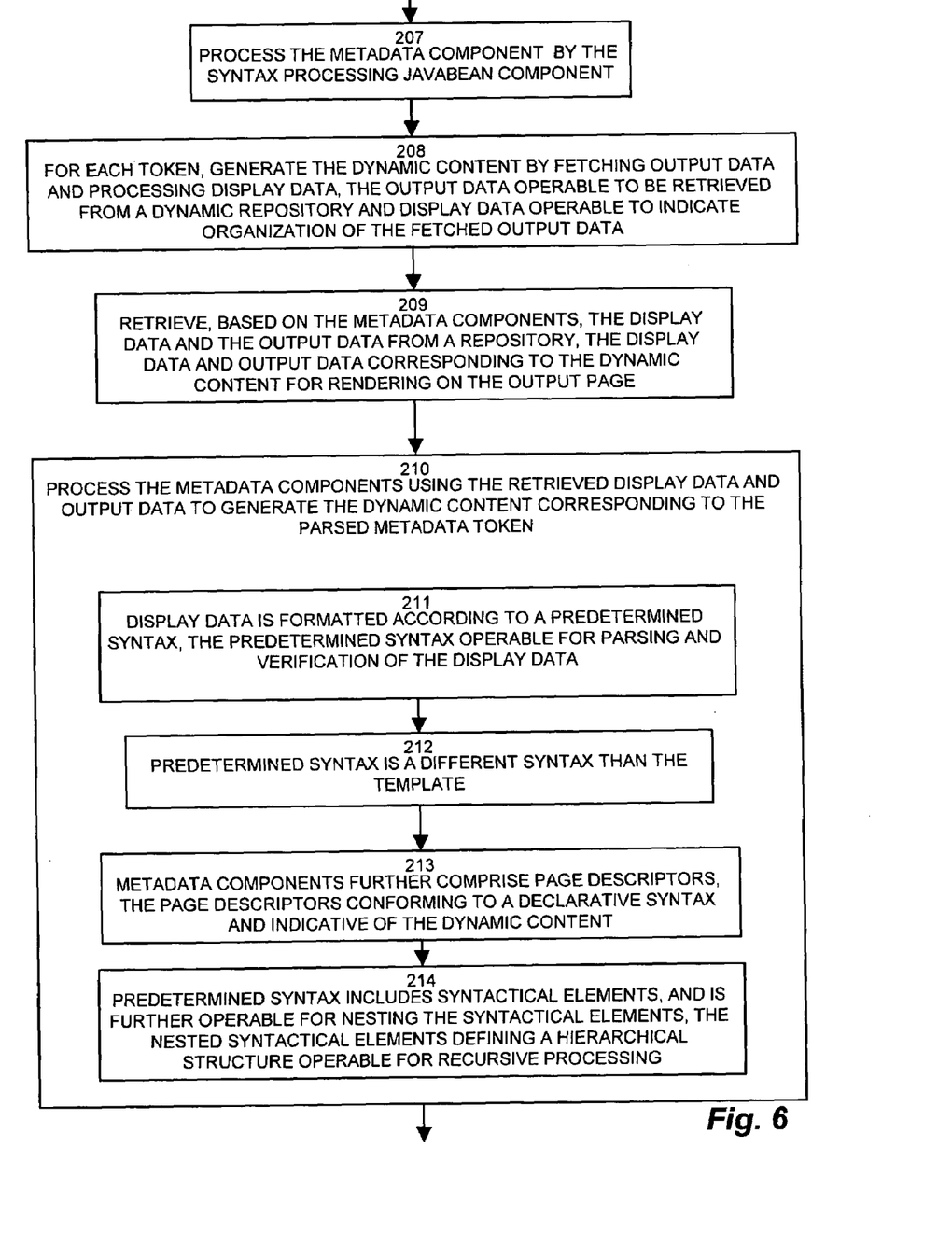
Figure 7:
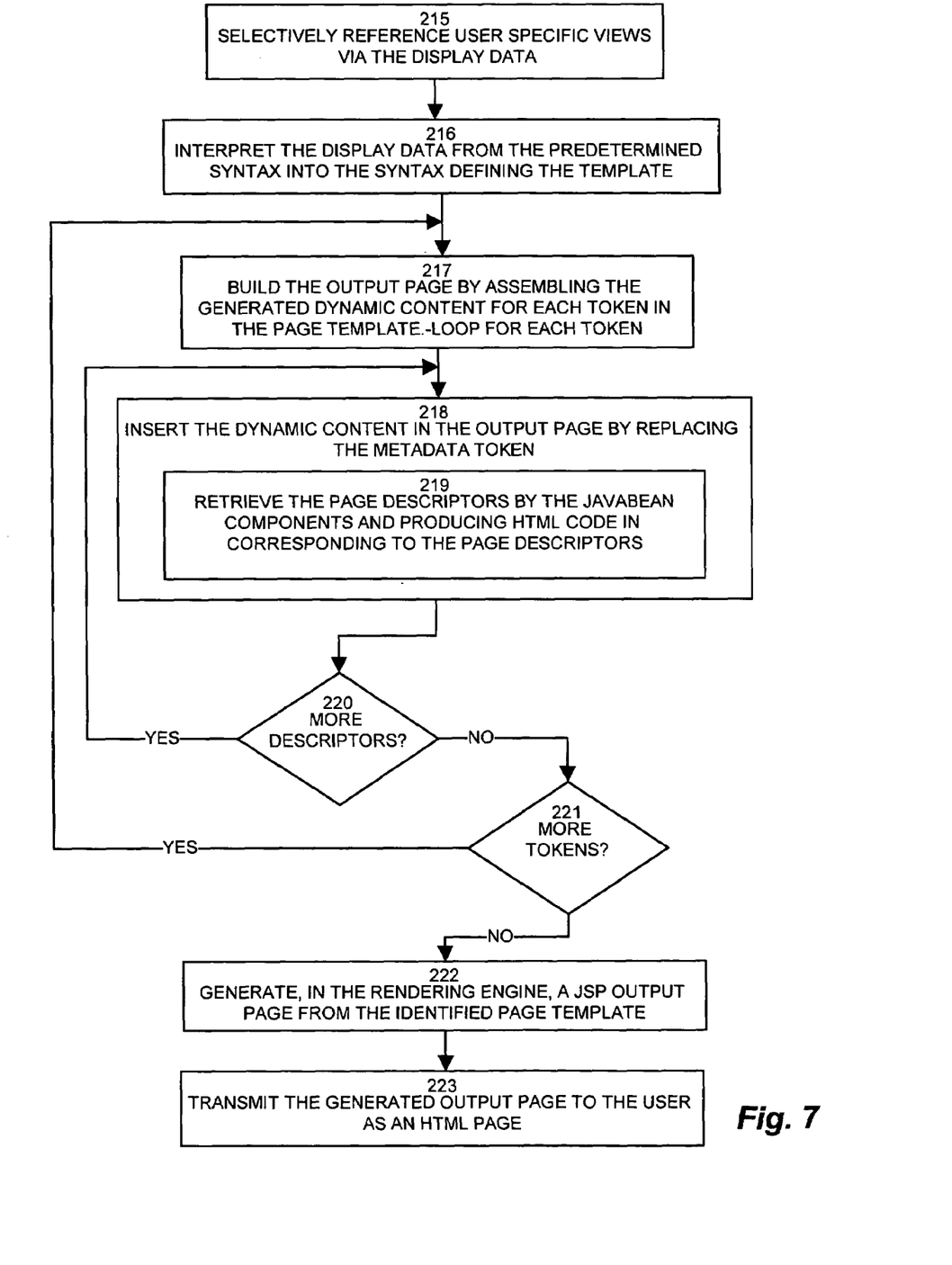

FIGS. 5-7 are a flowchart of a particular configuration of the invention of FIG. 1 in greater detail employing JSP template pages and XML descriptors. Referring to FIGS. 1, 3 and 5-7, the web server 12 or web application 24 receives an HTTP request 20 on behalf of the user 14, in which the HTTP request 20 is indicative of an HTML response 22, as depicted at step 200. The 14 user controlled browser 18 typically generates the HTTP request 20, often in conjunction with the web application 24 serving the user. Such HTTP requests 20 often embed other control and data information into the request, as will be shown below.

The web server 12 determines the page template 26 corresponding to the requested HTML response 22, employing the incoming HTTP request 20, as depicted at step 201. The template 26 may be a default, or may selectively correspond to the web application 24 or control parameters embedded in the HTTP request 20. Responsive to the request 20, the rendering engine 34 identifies or obtains the page template 26 indicative of an output page 36 having static content 37. The parser 48 receives the identified template 26 as the basis from which to generate the output page 36 with the generated dynamic content 38. Therefore, the template 26 may be considered to be indicative of the static content portion 37 of the output page 36, as disclosed at step 202.

The parser parses tokens 30 from the page template 26, in which the tokens 30 are indicative of the dynamic content 38. In the exemplary configuration, the tokens 30 are metadata tokens. Therefore, at step 203, the parser parses the metadata tokens from the page template, in which each of the metadata tokens is indicative of dynamic content 38.

In a particular configuration, the dynamic content 38 further comprises java server pages referencing metalanguage representations of at least portions of other java server pages corresponding to the same rendered output page 74, as depicted at step 204. Such java server pages (JSPs), as indicated above, conventionally enable substantial replicated code. In the exemplary configuration, parsing further includes identifying a javabean component 66-1 . . . 66-3 operable to process the parsed metadata token 30, as shown at step 205.

The syntax processor 50, responsive to each parsed token 30, retrieves, from a metadata repository in the dynamic repository 54, the identified metadata components 32 corresponding to the metadata tokens 30. In the exemplary configuration, the metadata components 32 are XML files 42 adapted for processing by javabean components 66, and are operable to provide the dynamic content 38 corresponding to the parsed metadata token 30 upon invocation by the syntax processor 50, as depicted at step 206.

The syntax processor 50 then begins processing the metadata components 32 by the javabean components 66, as shown at step 207. In the exemplary configuration disclosed, the syntax processor 24 performs, or executes, the retrieved metadata components 32 corresponding to each of the parsed tokens 30 to generate the dynamic content 38 for each token 30. As disclosed at step 208, generating the dynamic content 38 involves fetching output data 60 and processing display data 58. The output data 60 is operable to be retrieved from a dynamic repository 54 and the display data 58 is operable to indicate the organization of the fetched output data 60. At step 209, in further detail, the syntax processor 50 retrieves, based on each of the executing metadata components 32, the display data 58 and the output data 60 from the dynamic repository 54, in which the display data 58 and output data 60 corresponding to the dynamic content 38 for rendering on the output page 36.

At step 210, the syntax processor 24 invokes javabean components 66 for each of the metadata components 32 to perform processing using the retrieved display data 58 and the output data 60 and generates the dynamic content 38 corresponding to each of the parsed metadata tokens 30. Step 210 includes, in further detail, processing display data 58 formatted according to a predetermined syntax, in which the predetermined syntax is operable for parsing and verification of the display data 58, as shown at step 211. In the exemplary configuration disclosed, the predetermined syntax is XML compliant, supporting the verification and portability of the metadata components 32 because of the parseable text nature of XML.

At step 212, the predetermined syntax is a different syntax than the template, such that the javabean components 66 interpret the predetermined syntax into the syntax of the output page 36. In the exemplary configuration, the beans 66 interpret the predetermined XML compliant syntax of the metadata components 32 into JSPs for display on the user device 14.

The predetermined syntax of the metadata components 32 further includes page descriptors 62, as depicted at step 213. The page descriptors 62 conforming to a declarative syntax built on XML (hence XML compliant) and indicative of the dynamic content 38. The page descriptors 62 of the predetermined syntax operate as syntactical elements, and are further operable for nesting such that the nested syntactical elements 62 defining a hierarchical structure operable for recursive processing, as depicted at step 214. Such a predetermined syntax is therefore a page descriptor 62 syntax defined by an XML schema, in which the syntactical elements further contain XML tags.

The page descriptor syntax of the system of the present invention is also operable to process display data which selectively references user 14 specific views, as depicted at step 215. The user 14 specific views allow different users 14 to specify display data 58 consistent with personal preferences. The bean 66 processes the display data 58 according to the user specified preferences and renders the corresponding dynamic content in the format specified by the user 14 view, discussed further below with respect to FIGS. 8 and 9.

The beans 66 interpret the retrieved display data 58 from the predetermined syntax, or XML page descriptor 62 syntax, into the JSP syntax defining the template 26, as shown at step 216. The beans therefore interpret the XML page descriptors 62 to produce java compliant JSP syntax in the JSP output page 74. Once the syntax processor 24 completes processing each of the XML files 42 (metadata components) of tokens 30 parsed from the template, the formatter 52 builds the output page 36 by assembling the generated dynamic content portions 38 for each token 30 in the page template 26, as depicted at step 217.

The formatter 52 inserts the dynamic content portions 58 in the output page 74 by replacing the metadata tokens 30 with the corresponding content portions 58 generated by the beans 66 from parsed tokens 30, as shown at step 218. The formatter inserts by iterating through each content portion 58 from a bean 66 or other sequential or parallel method. At step 219, in the exemplary configuration, the metadata components 32 are XML files 42-1 . . . 42-3 (42 generally) including at least one page descriptor 62 according to the predetermined syntax. The javabean 66 processing further includes retrieving the page descriptors 62 by the javabean components 66 and producing the formatted dynamic content 68 as HTML code in the JSP output page 74 corresponding to the page descriptors 62.

The rendering engine 34 performs a check for more descriptors 62 corresponding to the current XML file 42, as shown at step 220. If there are more descriptors in the current XML file, then control reverts to step 218 until all the descriptors 62 are processed. When all descriptors 62 in the current XML file 42 are rendered as formatted dynamic content 68 in the JSP output page 74, the rendering engine 34 performs a check for additional tokens 30 and corresponding XML files 42 for processing, as depicted at step 221. Control then reverts to step 217 until the rendering engine 34 processes all XML files 42 (metadata components 32).

At step 222, the rendering engine 34 generates the complete JSP output page 74 from the identified page template 26, therefore producing formatted dynamic content 68 for each parsed token 30, as shown at step 222. The rendering engine 34 then delivers the JSP output page 74 to the web server 12 for transmission of the generated output page 38, or output report, to the user 14 as an HTML output page 78.

Figure 8:
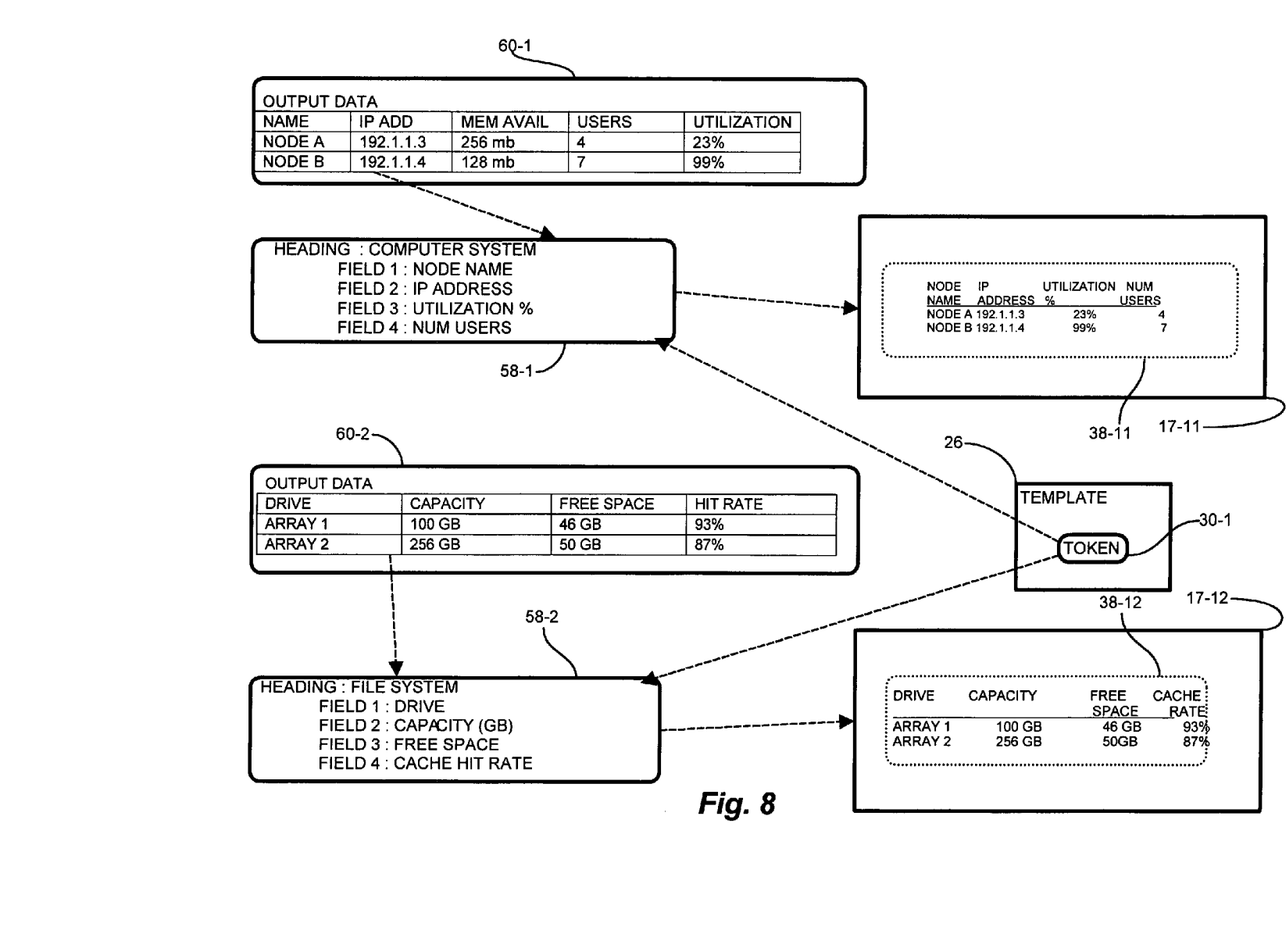
FIGS. 8 and 9 are an example illustrating different dynamic content in a template and different user views.
Figure 9:
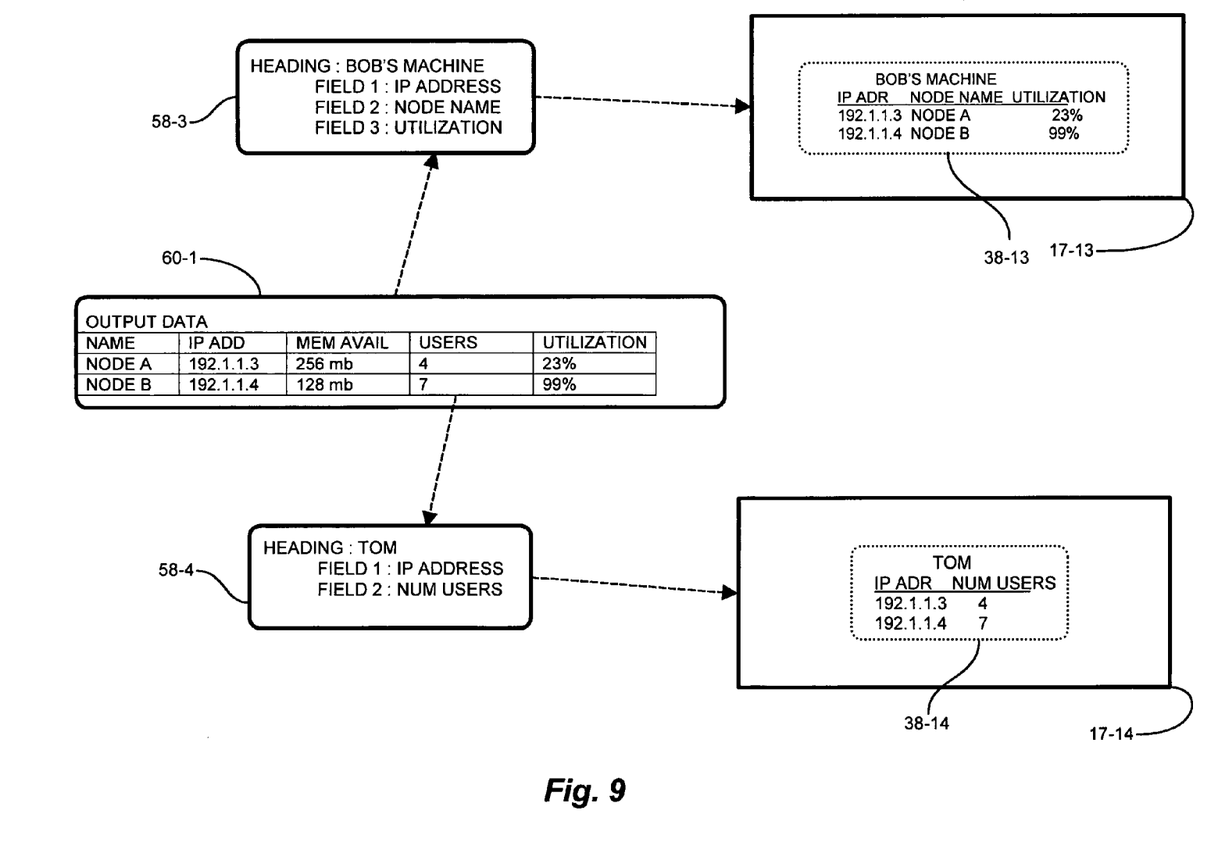

FIGS. 8 and 9 are an example illustrating different dynamic content in a template and different user views. Referring to FIGS. 3, 8 and 9, exemplary user display pages 17-11 . . . 17-14.4 each include dynamic content 36-1 . . . 36-4, respectively. Each of the user display pages 17-11 . . . 17-14 illustrates different rendering of the dynamic (active) content by employing the rendering engine 34 and associated metadata components 32, display data 58, and output data 60 with the same template 26-1. As indicated above, the display data 58 indicates cosmetic arrangement of the data, such as column and row order and spacing. The output data 60 includes the data values for display according to the display data.

For example, output screens 17-11 and 17-12 illustrate rendering of computer system information and file system information, respectively. The template 26-1 includes a token 30-1 for rendering table data. The rendering engine 34 displays computer system information as dynamic content 36-11, in output screen 17-11, and the file system information 36-12 as dynamic content 36-12 in the output screen 17-11. The rendering engine 34 determines, from the user request 20 and logic in the metadata components 32, whether to display the file system information or the computer system information.

The rendering engine 34 renders the output screen 17-11 by employing the display data 58-1, directed to the computer system information table 36-11, and the output data 60-1 containing the raw performance data for the computer system. In contrast, the rendering engine employs the same template 30-1 for output screen 17-12 by employing the display data 58-2, depicting the file system information table 36-12 and the output data 60-2 containing storage volume data.

In a further configuration, the rendering engine employs user specific views. The syntax processor 50 obtains the username from the http request or other source, and the beans 66 execute conditionally depending on the user. Specifically, output screen 17-13, corresponding to user BOB, employs display data 58-3, indicative of the user view for BOB. Similarly, output screen 17-14 employs display data 584, containing the user view for user TOM. In alternate configurations, the rendering engine may perform other selective and conditional operations based on logic encoded in the metadata components 32 and attributes from the user http request 20.

It should be noted that the exemplary implementation discussed above employs an output report as an HTML web page, as is characteristic of typical web based applications. The systems and methods discussed above, including the exemplary parsing and syntax processing of metadata descriptors in a declarative language, are applicable to other output reports from in an information processing environment. Accordingly, the systems and methods discussed above with respect to the exemplary web output pages are applicable to any output report format or protocol operable for responsive delivery and display to a user.

Those skilled in the art should readily appreciate that the programs and methods for rendering content as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for rendering content has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for producing an output report comprising:

identifying a page template indicative of an output report having passive content, the passive content being static;

parsing tokens from the page template, the tokens being metadata tokens indicative of dynamic content, the dynamic content adapted to provide at least a portion of the output report, each of the metadata tokens corresponding to a javabean component such that parsing further comprises identifying the javabean component, the javabean component operable to process the metadata token;

retrieving, from a metadata repository, by the javabean component, metadata components corresponding to the metadata tokens and operable to provide the dynamic content corresponding to the parsed metadata tokens; and processing the metadata component by the javabean component;

for each token, generating the dynamic content, said generating further comprising fetching output data and processing display data, the output data operable to be retrieved from a dynamic repository and the display data operable to indicate organization of the fetched output data; generating the dynamic content further comprising:

retrieving, based on the metadata components, the display data and the output data from a repository, the display data and output data corresponding to the dynamic content for rendering on the output report;

processing the metadata components using the retrieved display data and output data to generate the dynamic content corresponding to the parsed metadata tokens; and building the output report by assembling the generated dynamic content for each token in the page template, the page template indicative of a plurality of output reports, the dynamic content further comprising java server pages referencing metalanguage representations of at least portions of other java server pages corresponding to the same rendered output report, building further comprising rendering an output page by: fetching, based on the parsed token, a page descriptor corresponding to the parsed token, the page descriptor defining the metalanguage representation;

retrieving the dynamic content from the fetched page descriptor; and inserting the dynamic content in the output report by replacing the metadata tokens.

2. The method of claim 1 further comprising receiving a user request for an HTML page, wherein said building further comprises rendering the HTML page responsive to the user request.

3. The method of claim 1 wherein said building the output report further comprises receiving an HTTP request on behalf of a user, the HTTP request indicative of an HTML response;

determining the page template corresponding to the requested HTML response;

generating, in a rendering engine, a JSP output page from the determined page template; and transmitting the generated JSP output page to the user as an HTML page.

4. The method of claim 1 wherein the display data is formatted according to a predetermined syntax, the predetermined syntax operable for parsing and verifying the display data.

5. The method of claim 4 wherein the predetermined syntax is a different syntax than the page template and said generating further comprises interpreting the display data from the predetermined syntax into the syntax defining the page template.

6. The method of claim 4 wherein the predetermined syntax includes syntactical elements, and is further operable for nesting the syntactical elements, the nested syntactical elements defining a hierarchical structure.

7. The method of claim 6 wherein the dynamic content is active content and the predetermined syntax conforms to XML, in which the syntactical elements further comprise XML tags.

8. The method of claim 7 wherein the predetermined syntax is a page descriptor syntax defined by an XML schema.

9. The method of claim 1 wherein the metadata components further comprise page descriptors, the page descriptors conforming to a declarative syntax and indicative of the dynamic content.

10. The method of claim 9 wherein the metadata component is an XML file including at least one page descriptor according to a predetermined syntax, and said processing further comprises retrieving the at least one page descriptors by the javabean component and producing HTML code corresponding to the at least one page descriptors.

11. The method of claim 1 wherein the display data further comprises user specific views, the user specific views indicative of formatting and display preferences specific to a particular user and operable for interpretation by syntax processing components to render the display data according to the user specific views.

12. The method of claim 1 wherein the predetermined syntax comprises javabean components operable to interpret the predetermined syntax into a syntax of the output page, further comprising:

invoking the javabean components for each of the tokens to perform processing using the display data and the output data; and generating the dynamic content corresponding to each of the parsed tokens.

13. The method of claim 12 wherein further comprising invoking the javabean components to interpret the predetermined syntax, the syntax being XML compliant, of a metadata component corresponding to the token for display on a user device.

14. The method of claim 1 wherein a predetermined syntax comprises javabean components operable to interpret the predetermined syntax into the syntax of the output page, further comprising invoking the javabean components for a metadata component corresponding to the token to perform processing using the display data and the output data; and generating the dynamic content corresponding to each of the parsed tokens.

15. The method of claim 14 further comprising invoking the javabean components to interpret the predetermined syntax, the predetermined syntax being XML compliant, of the metadata components for display on a user device.

16. A data processing device responsive to an encoded set of processor based instructions, the instructions encoded in a memory of the data processing device for producing an output report comprising:

a web server operable to identify a page template indicative of an output report having passive content, the passive content being static the page template indicative of a plurality of output reports;

a parser operable to parse tokens from the page template, the tokens being metadata tokens indicative of dynamic content, the dynamic content adapted to provide at least a portion of the output report, the metadata token corresponding to a javabean component and the parser further operable to identify the javabean component, the javabean component operable to process the metadata token, and the syntax processor is operable to invoke the javabean component for retrieving and processing the metadata component;

a syntax processor operable to, for each token, generate the dynamic content, said generating further comprising fetching output data and processing display data, the output data operable to be fetched from a dynamic repository and the display data operable to indicate organization of the fetched output data, the syntax processor further operable to:

retrieve, based on the metadata components, the display data and the output data from a repository, the display data and output data corresponding to the dynamic content for rendering on the output report; and process the metadata components using the retrieved display data and output data to generate the dynamic content corresponding to the parsed metadata tokens, the syntax processor further operable to process the display data formatted according to a predetermined syntax, the predetermined syntax operable for parsing and verifying the display data, the predetermined syntax being a different syntax than the page template and said generating further comprising interpreting the display data from the predetermined syntax into the syntax defining the page template, wherein the predetermined syntax includes syntactical elements, and is further operable for nesting the syntactical elements, the nested syntactical elements defining a hierarchical structure; and a formatter operable to build the output report by assembling the generated dynamic content for each token in the page template, the dynamic content further comprising java server pages referencing metalanguage representations of at least portions of other java server pages corresponding to the same rendered output report, building by the formatter further comprising rendering an output page by:

fetching, based on the parsed token, a page descriptor corresponding to the parsed token, the page descriptor defining the metalanguage representation;

retrieving the dynamic content from the fetched page descriptor; and inserting the dynamic content in the output report by replacing the metadata tokens.

17. The data processing device of claim 16 wherein the web server further comprises an interface operable to receive a user request for an HTML page, wherein said building further comprises rendering the HTML page responsive to the user request.

18. The data processing device of claim 16 wherein the formatter is further operable to produce the output report by:

receiving an HTTP request on behalf of a user, the HTTP request indicative of an HTML response;

determining the page template corresponding to the requested HTML response;

generating, in a rendering engine, a JSP output page from the determined page template; and transmitting the generated JSP output page to the user as an HTML page.

19. The data processing device of claim 16 wherein the dynamic content is active content and the predetermined syntax conforms to XML, in which the syntactical elements further comprise XML tags.

20. The data processing device of claim 16 wherein the predetermined syntax is a page descriptor syntax defined by an XML schema.

21. The data processing device of claim 16 wherein the metadata components further comprise page descriptors, the page descriptors conforming to a declarative syntax and indicative of the dynamic content.

22. The data processing device of claim 21 wherein the metadata component is an XML file including at least one page descriptor according to the predetermined syntax, and the syntax processor is further operable to retrieve the page descriptors via the javabean components and produce HTML code corresponding to the at least one page descriptor.

23. The data processing device of claim 16 wherein the display data further comprises user specific views, the user specific views indicative of formatting and display preferences specific to a particular user and operable for interpretation by syntax processing components to render the display data according to the user specific views.

24. The data processing device of claim 16 wherein the predetermined syntax comprises javabean components operable to interpret the predetermined syntax into a syntax of the output page, wherein the syntax processor:

invokes the javabean components for each of the tokens to perform processing using the display data and the output data; and generates the dynamic content corresponding to each of the parsed tokens.

25. The data processing device of claim 24 wherein the syntax processor is further operable to invoke the javabean components to interpret the predetermined XML compliant syntax of a metadata component corresponding to the tokens for display on a user device.

26. A computer program product having a computer readable medium storing computer program logic embodied in computer program code encoded thereon for producing an output report comprising:

computer program code for identifying a page template indicative of an output report having passive content, the passive content being static, the page template indicative of a plurality of output reports;

computer program code for parsing tokens from the page template, the tokens being metadata tokens indicative of dynamic content, the dynamic content adapted to provide at least a portion of the output report, each of the metadata tokens corresponding to a javabean component such that parsing further comprises identifying the javabean component, the javabean component operable to process the metadata token;

retrieving, from a metadata repository, by the javabean component, metadata components corresponding to the metadata tokens and operable to provide the dynamic content corresponding to the parsed metadata tokens; and processing the metadata component by the javabean component;

computer program code operable for generating, for each parsed token, the dynamic content, said generating further comprising fetching output data and processing display data, the display data formatted according to a predetermined syntax, the predetermined syntax operable for parsing and verifying the display data, the output data operable to be retrieved from a dynamic repository and the display data operable to indicate organization of the retrieved output data, the dynamic content further comprising java server pages referencing metalanguage representations of at least portions of other java server pages corresponding to the same rendered output report, generating the dynamic content further comprising:

retrieving, based on the metadata components, the display data and the output data from a repository, the display data and output data corresponding to the dynamic content for rendering on the output report;

processing the metadata components using the retrieved display data and output data to generate the dynamic content corresponding to the parsed metadata tokens; and computer program code for building the output report by assembling the generated dynamic content for each token in the page template, building further comprising rendering an output page by:

fetching, based on the parsed token, a page descriptor corresponding to the parsed token, the page descriptor defining the metalanguage representation;

retrieving the dynamic content from the fetched page descriptor, wherein the predetermined syntax comprises javabean components operable to interpret the predetermined syntax into a syntax of the output page; and inserting the dynamic content in the output report by replacing the metadata tokens;

computer program code for invoking the javabean components for each of the metadata components to perform processing using the retrieved display data and the output data; and computer program code for generating the dynamic content corresponding to each of the parsed metadata tokens.

27. An encoded set of processor based instructions having program code in an executable form on a computer readable storage medium for producing an output report comprising:

program code for identifying a page template indicative of an output report having passive content, the passive content being static, the page template indicative of a plurality of output reports;

program code for parsing tokens from the page template, the tokens being metadata tokens indicative of dynamic content, the dynamic content adapted to provide at least a portion of the output report, each of the metadata tokens corresponding to a javabean component such that parsing further comprises:

identifying the javabean component, the javabean component operable to process the metadata token; and retrieving, from a metadata repository, by the javabean component, metadata components corresponding to the metadata tokens and operable to provide the dynamic content corresponding to the parsed metadata tokens;

program code for generating, for each token, the dynamic content, said generating further comprising fetching output data and processing display data, the output data operable to be fetched from a dynamic repository and the display data operable to indicate organization of the fetched output data, generating the dynamic content further comprising:

retrieving, based on the metadata components, the display data and the output data from a repository, the display data and output data corresponding to the dynamic content for rendering on the output report;

processing the metadata components using the retrieved display data and output data to generate the dynamic content corresponding to the parsed metadata tokens, the display data formatted according to a predetermined syntax, the predetermined syntax operable for parsing and verifying the display data, the predetermined syntax being a different syntax than the page template and said generating further comprising interpreting the display data from the predetermined syntax into the syntax defining the page template, the predetermined syntax including syntactical elements, and further operable for nesting the syntactical elements, the nested syntactical elements defining a hierarchical structure; and program code for building the output report by assembling the generated dynamic content for each token in the page template, building further comprising rendering an output page by:

fetching, based on the parsed token, a page descriptor corresponding to the parsed token, the page descriptor defining the metalanguage representation; and retrieving the dynamic content from the fetched page descriptor, the retrieved dynamic content further comprising java server pages referencing metalanguage representations of at least portions of other java server pages corresponding to the same rendered output report; and inserting the dynamic content in the output report by replacing the metadata tokens.

28. A processor based information processing device responsive to encoded set of processor based instructions encoded in a memory of the information processing device for producing an output report comprising:

means for identifying a page template indicative of an output report having passive content, the passive content being static, the page template indicative of a plurality of output reports;

means for parsing tokens from the page template, the tokens being metadata tokens indicative of dynamic content, the dynamic content adapted to provide at least a portion of the output report, each of the metadata tokens corresponding to a javabean component such that the means for parsing further comprises:

means for identifying the javabean component, the javabean component operable to process the metadata token; and means for retrieving, from a metadata repository, by the javabean component, metadata components corresponding to the metadata tokens and operable to provide the dynamic content corresponding to the parsed metadata tokens; and processing the metadata component by the javabean component;

means for generating, for each token, the dynamic content, said generating further comprising fetching output data and processing display data, the output data operable to be fetched from a dynamic repository and the display data operable to indicate organization of the fetched output data, generating the dynamic content further comprising:

retrieving, based on the metadata components, the display data and the output data from a repository, the display data and output data corresponding to the dynamic content for rendering on the output report; and processing the metadata components using the retrieved display data and output data to generate the dynamic content corresponding to the parsed metadata tokens, the display data formatted according to a predetermined syntax, the predetermined syntax operable for parsing and verifying the display data, the predetermined syntax being a different syntax than the page template and said generating further comprising interpreting the display data from the predetermined syntax into the syntax defining the page template, the predetermined syntax including syntactical elements, and further operable for nesting the syntactical elements, the nested syntactical elements defining a hierarchical structure; and means for building the output report by assembling the generated dynamic content for each token in the page template, means for building further comprising means for rendering an output page by:

means for fetching, based on the parsed token, a page descriptor corresponding to the parsed token, the page descriptor defining the metalanguage representation;

means for retrieving the dynamic content from the fetched page descriptor and means for inserting the dynamic content in the output report by replacing the metadata tokens, the dynamic content further comprising java server pages referencing metalanguage representations of at least portions of other java server pages corresponding to the same rendered output report, the predetermined syntax comprising javabean components operable to interpret the predetermined syntax into the syntax of the output page, wherein the means for generating further comprises:

means for invoking the javabean components for each of the metadata tokens to perform processing using the display data and the fetched output data; and means for generating the dynamic content corresponding to each of the parsed tokens.

* * * * *